United States Patent [19]

Vinette

[11] Patent Number: 5,796,330

[45] Date of Patent: Aug. 18, 1998

[54] SECURITY SYSTEM

[76] Inventor: Richard H. Vinette, P.O. Box 191, Lanesboro, Mass. 01237

[21] Appl. No.: 800,806

[22] Filed: Feb. 18, 1997

Related U.S. Application Data

[63] Continuation-in-part of Ser. No. 317,557, Oct. 4, 1994, abandoned.

[51] Int. Cl.⁶ .................................................. G08B 23/00
[52] U.S. Cl. .......................... 340/426; 340/573; 109/29; 239/124; 366/136
[58] Field of Search .................... 340/426, 573, 340/574; 109/29; 239/124; 307/10.2; 366/136, 137; 180/287

[56] References Cited

U.S. PATENT DOCUMENTS

| | | | |
|---|---|---|---|
| 5,280,268 | 1/1994 | Matthews | 340/426 |
| 5,318,147 | 6/1994 | Maiefski | 180/287 |
| 5,493,268 | 2/1996 | Lewis, Sr. et al. | 340/426 |
| 5,644,297 | 7/1997 | Masi et al. | 340/573 |

*Primary Examiner*—Edward Lefkowitz
*Attorney, Agent, or Firm*—Oliff & Berridge, PLC

[57] ABSTRACT

A security system for dispensing a deterrent fluid is provided. The security system includes a storage tank which contains the fluid, at least one spray nozzle assembly, a pump for pumping the fluid from the storage tank to the spray nozzle assembly and a pressure relief valve connected to the storage tank. The security system also includes first piping assembly connecting the storage tank to the pump. This first piping assembly includes a check valve to deter the flow of the fluid from the pump back to the storage tank. The security system also includes a second piping assembly connecting the pump to the spray nozzle. This piping assembly includes a mechanism for activating the pump and the spray nozzle. Finally, the security system includes a third piping assembly which comprises a second flow path from the pump to the storage tank. The pressure relief valve relieves any unwanted pressure from the system whenever the system is deactivated, such that the system is only under pressure when in use.

13 Claims, 5 Drawing Sheets

5,796,330

1

SECURITY SYSTEM

This is a Continuation-in-Part of application Ser. No. 08/317,557, filed Oct. 4, 1994 now abandoned.

BACKGROUND OF THE INVENTION

1. Field of Invention

This invention relates to security systems which dispense a deterrent fluid when activated. More particularly, this invention pertains to self-contained security systems which dispense a fluid at a subject when the security systems are activated.

Thefts of automobiles and other vehicles are a continuing major crime problem. In recent years, vehicle thieves have become more bold, and have stolen vehicles while the vehicles are occupied. This crime is commonly called "car-jacking".

Car-jackings pose a great danger to the vehicle drivers, as well as other occupants of the vehicles being car-jacked. Many vehicle occupants have been killed or seriously injured during car-jackings.

Car-jackings are usually committed by the thieves approaching occupied vehicles and using weapons to scare the occupants into leaving the vehicles. If any resistance is encountered, or sometimes even if there is no resistance, the vehicle occupants are often assaulted with the weapons and murdered or seriously injured.

While there are numerous devices on the market for preventing the theft of unoccupied vehicles, such devices vary in effectiveness, safety and cost. There is still nothing on the market which is one hundred percent effective. Moreover, these devices do not have a deterrent effect on car-jackings.

With respect to car-jackings, there is no known deterrent which does also not increase the risk of physical harm to the occupants. In fact, once a vehicle is being car-jacked, there is no deterrent if the vehicle occupants cannot physically get away from the car-jackers. Once a car-jacking has commenced, the vehicle occupants are basically at the mercy of the car-jackers since the car-jackers may inflict physical harm on the occupants even if the occupants relinquish control of the vehicle.

In addition to thefts of entire vehicles, there is also a continuing crime problem involving the thefts of items from vehicles, either occupied or unoccupied. For example, thefts from armored vehicles, thefts of compact disk players from vehicles, etc. are a continuing crime problem.

Furthermore, thefts of valuables from stationary structures are a continuing major crime problem. Such thefts include thefts from homes, retail establishments and other commercial enterprises, such as banks. While there are many security systems designed for these environments, thefts from such environments are still common since these security systems can be avoided and/or deactivated while the thefts are in progress.

In addition, crimes are sometimes committed by crowds of persons under certain circumstances. It is often desirable to disperse crowds of persons in such circumstances before the crowd becomes unruly. It is further desirable that the mechanisms which are employed to disperse the crowds be non-lethal and portable so that the mechanisms can be transported by law enforcement personnel.

Thus, there is a continuing need for a safe, non-lethal, efficient and relatively low cost security system for unoccupied and occupied vehicles, stationary structures such as homes, banks and retail establishments and dispersing crowds.

2

One type of security system which has been developed dispenses a toxic and/or disabling gas or liquid when the system is approached by a criminal. These systems can be either automatically activated (e.g. by photoelectric cells or heat sensors) or manually activated by an occupant of the vehicle or physical structure. Such systems are disclosed in U.S. Pat. No. 1,502,537 issued to A. E. Anakin on Jul. 22, 1924, U.S. Pat. No. 1,688,479 issued to G. A. Wettengel on Oct. 23, 1928, U.S. Pat. No. 1,823,750 issued to M. W. McMullen et al on Sep. 15, 1931, U.S. Pat. No. 2,011,120 issued to G. Searle on Aug. 13, 1935, U.S. Pat. No. 2,072,941 issued to A. E. Burch, Jr., et al on Mar. 9, 1937, U.S. Pat. No. 3,915,103 issued to Rupert et al on Oct. 28, 1975, U.S. Pat. No. 4,841,752 issued to Fletcher on Jun. 27, 1989, U.S. Pat. No. 4,867,076 issued to Marcone on Sep. 19, 1989, U.S. Pat. No. 5,046,449 issued to Nelson on Sep. 10, 1991 and U.S. Pat. No. 5,060,864 issued to Nishi et al on Oct. 29, 1991.

While all of these patents disclose systems which dispense a fluid at a criminal to prevent a crime, none of these systems are entirely safe for the users, effective, compact and of relatively low cost. Moreover, each of these systems is a pressurized system, i.e., the fluid is constantly under pressure. This poses some safety risk to users and other persons in the vicinity of the systems. Moreover, it is highly unlikely that any constantly pressurized system will meet vehicle safety standards of the United States government or of the individual state governments. Further, having a pressurized system greatly increases the risk that the system will develop leaks and malfunction and adds the need for a relatively bulky pressurized tank with additional valving elements. In addition, the systems do not provide for mixing of the fluid after the systems are activated. Further, the systems are not designed to be transported by individuals.

Thus, there exists a need in the technology for a security system that dispenses fluids which is only under pressure when the fluids are actually being dispensed and is non-pressurized during all other times and that may mix the fluid when activated. Such a system must, of course, also be effective, safe and cost feasible.

SUMMARY OF THE INVENTION

This invention provides a security system which releases a deterrent fluid including a storage tank containing the fluid; at least one spray nozzle coupling assembly; a pump for pumping the fluid from the storage tank to the spray nozzle assembly; a first flow path providing flow of the fluid from the storage tank to the pump, the first flow path including a check valve located between the storage tank and the pump to prevent the flow of the fluid from the pump to the storage tank; a second flow path from the pump to the spray nozzle coupling assembly, the second flow path including an activating mechanism for activating the pump and the spray nozzle assembly; a third flow path from the pump back to the storage tank for mixing the components of the deterrent fluid and for testing system operation; a pressure relief valve connected to the storage tank for releasing pressure in the system and a switch mechanism for activating the activating member.

In certain embodiments of the invention, the pump is operational only when the system is activated such that the system is only under pressure when the system is activated.

In other embodiments, the pressure relief valve is positioned in the third flow path.

In some embodiments of this invention, the storage tank, pump and first and third flow paths of the security system are in a self-contained housing. In yet other embodiments, this housing is portable.

In certain embodiments, the activating mechanism is activated by an automatic sensory mechanism such as a photoelectric cell or heat sensor.

In further embodiments, the activating mechanism is manually operated, such as a pushbutton or a toggle switch.

In certain other embodiments, the activating-mechanism includes a solenoid and a power supply.

The security systems of this invention have many advantages over the prior security systems. These advantages include that, while the systems are designed for dispensing fluid, the systems are not constantly pressurized. There is no pressure in the systems until the systems are activated. Also, the systems are immediately de-pressurized when deactivated. Thus, the systems are relatively safe, since the systems are not under constant pressure.

Another advantage is that the systems are relatively inexpensive when compared to other systems for the same purpose.

An additional advantage is that the fluid may be mixed after the system is activated.

A further advantage is that the systems according to this invention can be very compact, if necessary due to space constraints in the intended use environments, or if the system is to be transported by individuals in a backpack or other means.

Yet another advantage is that spray nozzles of any type and design can be coupled to the nozzle coupling assemblies of the systems. Since the fluid can be directed through these nozzles in a stream or spray of a desired design and pattern, the systems can be adapted for various environments, and can be designed to only affect the intended targets, and not innocent bystanders. Thus, because the fluid can be directed to a specific target, the systems are effective.

Therefore, in summary, the advantages of systems according to this invention include that the systems are relatively safe, effective and inexpensive.

Other advantages and salient features of the invention will become apparent from this disclosure. Certain embodiments will now be described with respect to the drawings, wherein:

DETAILED DESCRIPTION OF PREFERRED EMBODIMENTS

Figure 1:
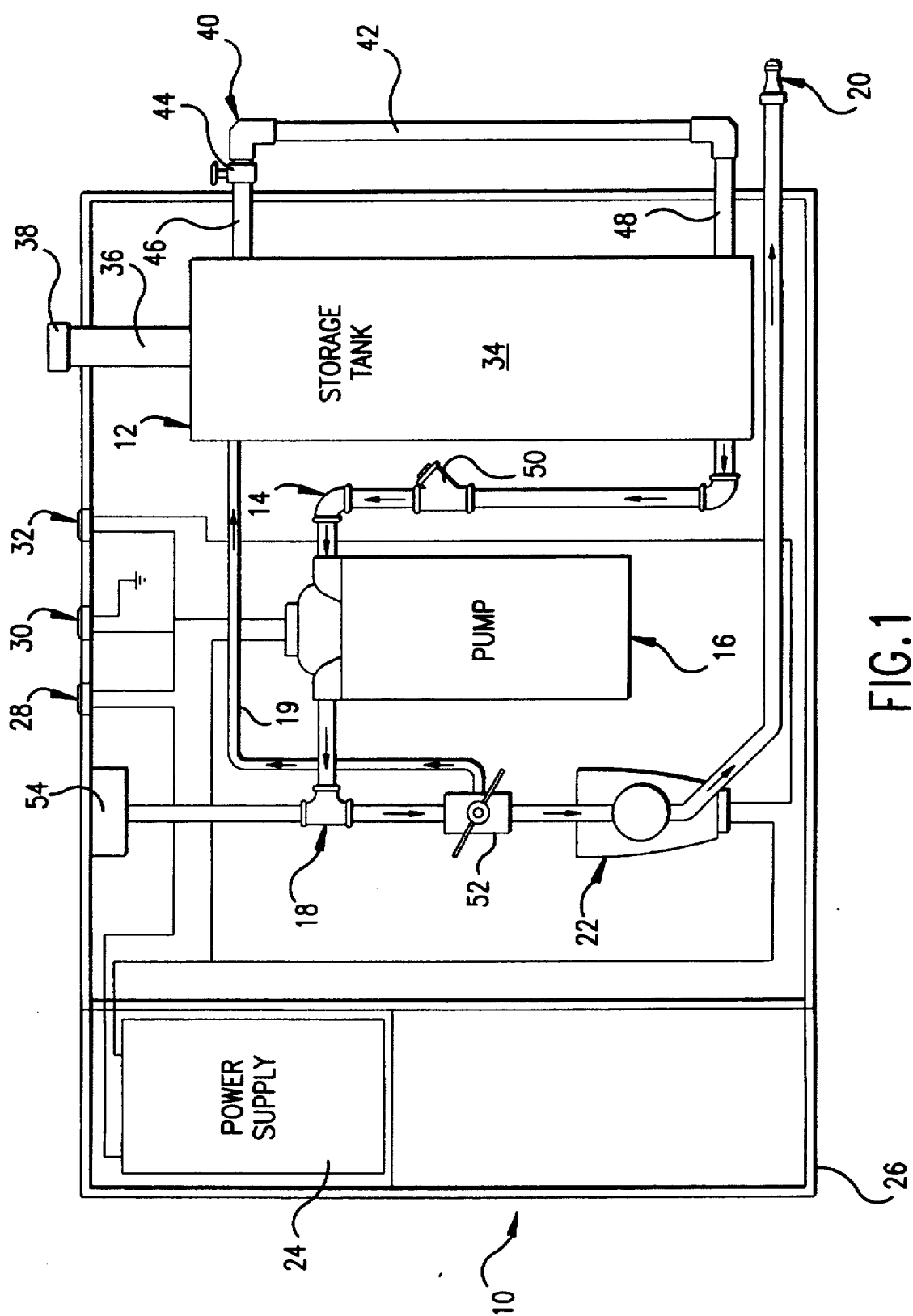
FIG. 1 is a schematic side view of a security system in accordance with this invention.

Referring to the figures, and in particular FIG. 1, a security system which discharges a deterrent fluid, security system 10, is disclosed which includes storage tank assembly 12, first piping assembly 14, pump assembly 16, second piping assembly 18, third piping assembly 19, nozzle coupling assembly 20, solenoid assembly 22, power supply 24, housing 26, arming switch assembly 28, indicator light assembly 30 and trigger switch assembly 32. Security system 10 is designed to discharge a toxic and/or disabling gas or liquid.

Storage tank assembly 12 includes storage tank 34, filler neck 36, filler cap 38 and gauge assembly 40. Gauge assembly 40 includes, in turn, gauge tube 42, bleeder valve assembly 44 and conduits 46 and 48.

In this embodiment of the invention, storage tank 34 does not have to be a pressurized tank. Rather, it can be a tank which is designed to contain non-pressurized fluid. This is an important feature of this embodiment since, generally non-pressurized tanks are less bulky, less complex and less expensive than tanks designed to contain a fluid under pressure.

To fill storage tank 34, or to refill storage tank 34, filler cap 38 is removed and the desired liquid or gas is poured or pumped into storage tank 34 through filler neck 36.

Gauge tube 42 is preferably made of a transparent, inert material such that the fluid can be viewed through gauge tube 42. Conduits 46 and 48 lead from the upper and lower ends, respectively, of storage tank 34 to the ends of gauge tube 42 so that the liquid in storage tank 34 freely travels to and from gauge tube 42. In this regard, the fluid level in gauge tube 42, when security system 10 is approximately level, accurately reflects the level of the fluid in storage tank 34.

Bleeder valve assembly 44 is designed such that any unwanted pressure can be relieved from storage tank 34, and also to drain the system, if desired. In this embodiment of the invention, bleeder valve assembly 44 is affixed to conduit 46.

First piping assembly 14 is a series of connected conduits connecting storage tank 34 with pump assembly 16. First piping assembly 14 includes check valve assembly 50 which prevents the back flow of fluid in first piping assembly 14, i.e., prevents fluid flow from pump assembly 16 to storage tank 34. Thus, first piping assembly 14 forms a first flow path from storage tank 34 to pump assembly 16.

Pump assembly 16 can include any of a number of commercially available pumps, for example, any 12 volt pump which has a pumping capacity of 15 psi. The pump capacity depends, of course, on the environment in which security system 10 is employed, the number of spray nozzles driven by the system and the fluid pressure necessary to achieve the desired fluid discharge pattern, trajectory and distance from the nozzles.

Second piping assembly 18 connects pump assembly 16 with nozzle coupling assembly 20, forming a second flow path from pump assembly 16 to nozzle coupling assembly 20. Second piping assembly 18 includes a series of connected conduits, needle valve assembly 52 and pressure gauge assembly 54. Third piping assembly 19 extends from needle valve assembly 52 to storage tank 34, forming a third flow path from needle valve assembly 52 to storage tank 34.

Needle valve assembly 52 is affixed to one of the conduits of second piping assembly 18 and functions to direct any pressurized fluid in system 10, when security system 10 is deactivated, to storage tank 34. The pressurized fluid will be redirected by needle valve 52 through third piping assembly 19 back to storage tank 34 when security system 10 is deactivated. The pressure can then be relieved through bleeder valve assembly 44, as discussed above.

Pressure gauge assembly 54 is for informational purposes to display the pressure, quantitatively, within the system. Since such pressure gauge assemblies are common in the trade, pressure gauge assembly 54 will not be illustrated or described in detail herein.

Nozzle coupling assembly 20 can be any of a number of coupling assemblies on the market. The nozzles 60 which are attached to coupling assembly 20 can be designed to project a single jet stream, or can be designed to dispense a stream, spray or other pattern of fluid a desired distance (e.g., 25 feet) at a desired radius (e.g., 180°). In addition, the spray nozzle 60 and spray nozzle assemblies can be oscillating, depending on the environment in which security system 10 is to be employed.

Solenoid assembly 22 may include any of a number of commercially available solenoids.

Likewise, power supply 24 may be any of a number of commercially available power supplies. For example, power supply 24 can be a 12 volt, 15 amp battery. The power capacity of power supply 24 depends on the power required to run security system 10.

Housing 26 can be made of any suitable strong, inert material, such as LEXAN®. Housing 26 can be made very compact depending on the size of storage tank 34, pump assembly 16 and power supply 24. For example, it is possible to have the housing be as compact as 12 inches high by 18 inches long by 5 inches in width. Housing 26 can be portable so that security system 10 can be removed when not needed, or so that a single security system 10 can be used in different environments.

Housing 26 can be rectangular, or any other desired shape. The only size and shape limitations are that housing 26 be of a sufficient shape and capacity to contain the various components of security system 10.

Arming switch assembly 28 is an activation switch assembly. That is, security system 10 is disarmed (i.e., not usable) until arming switch assembly 28 is activated. The switch assembly can be any type of switch assembly, for example, a key lock switch.

Indicator light assembly 30 depicts when security system 10 is armed and disarmed. When security system 10 is armed, a bulb of activator light assembly 30 will be illuminated and when the system is disarmed, the bulb will not be illuminated.

Trigger switch assembly 32 can be a pushbutton or other switch means which, when depressed or otherwise switched to the "on" position, activates solenoid 22 and the pump of pump assembly 16.

In other embodiments of this invention, security system 10 can be activated by non-manual or automatic mechanisms, such as photoelectric cells or heat sensors. These photoelectric or heat sensors activate the pump of pump assembly 16 and solenoid 22 when a foreign object is detected. In yet other embodiments, security system 10 may include both manual and automatic switch assemblies.

Figure 2:
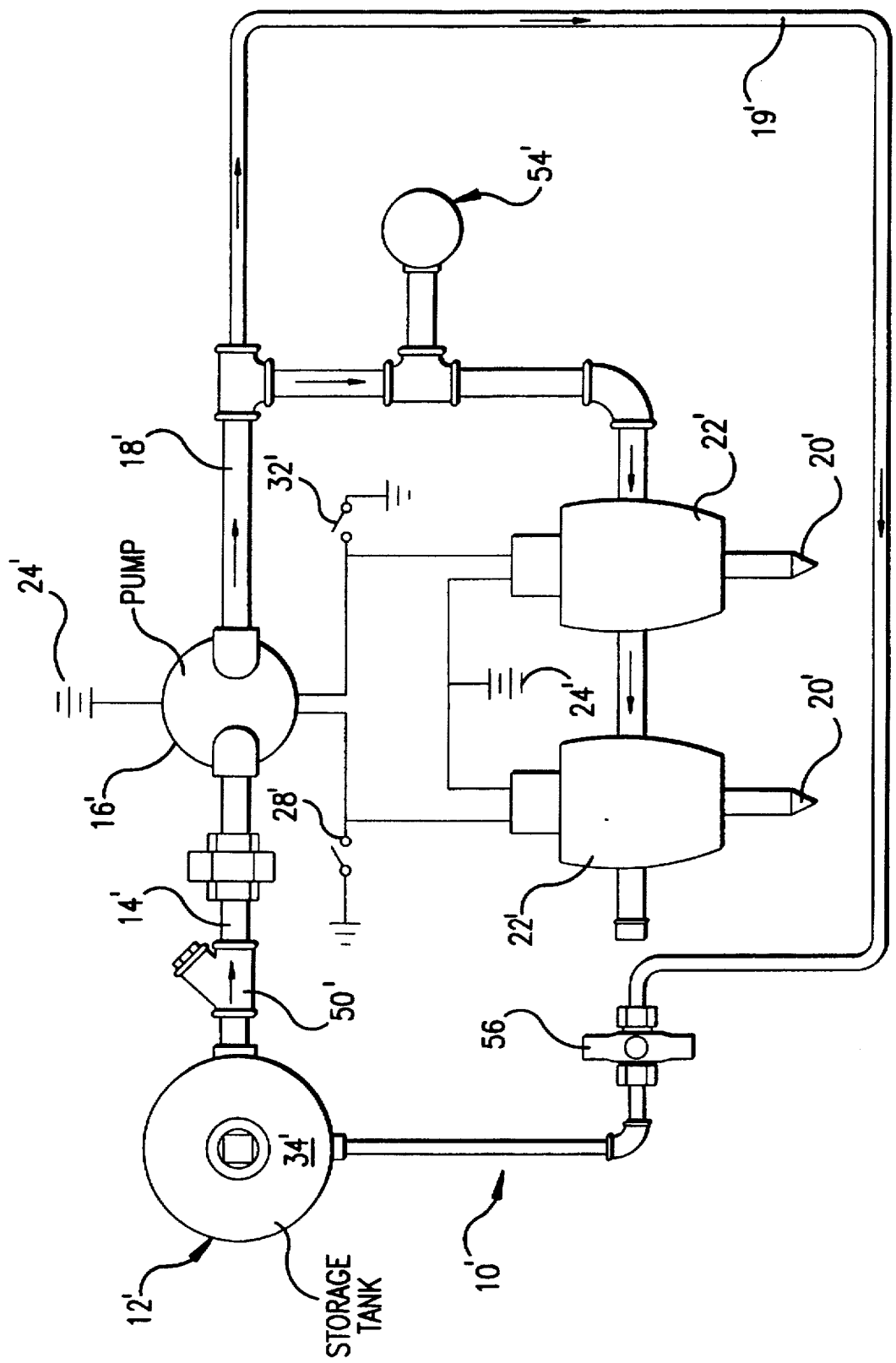
FIG. 2 is a schematic side view of a second security system in accordance with this invention.

As stated above, FIG. 2 depicts a second security system according to this invention, security system 10'. Security system 10' is substantially the same as security system 10. The elements of security system 10' which correspond to elements of security system 10 are identified with the same number followed by the prime mark "'". For example, security system 10' includes storage tank 34' which corresponds to storage tank 34 of security system 10.

One difference between security systems 10 and 10' is that needle valve assembly 52 of security system 10 is replaced by pressure release valve 56 of security system 10'. Pressure release valve 56 automatically relieves any pressure in security system 10' when security system 10' is deactivated. Specifically, when security system 10' is deactivated, solenoids 22' will be deactivated, thus blocking the flow of fluid to nozzle coupling assemblies 20'. The pressure built up in security system 10' when this occurs will automatically be relieved by pressure relief valve 56.

Figure 3:
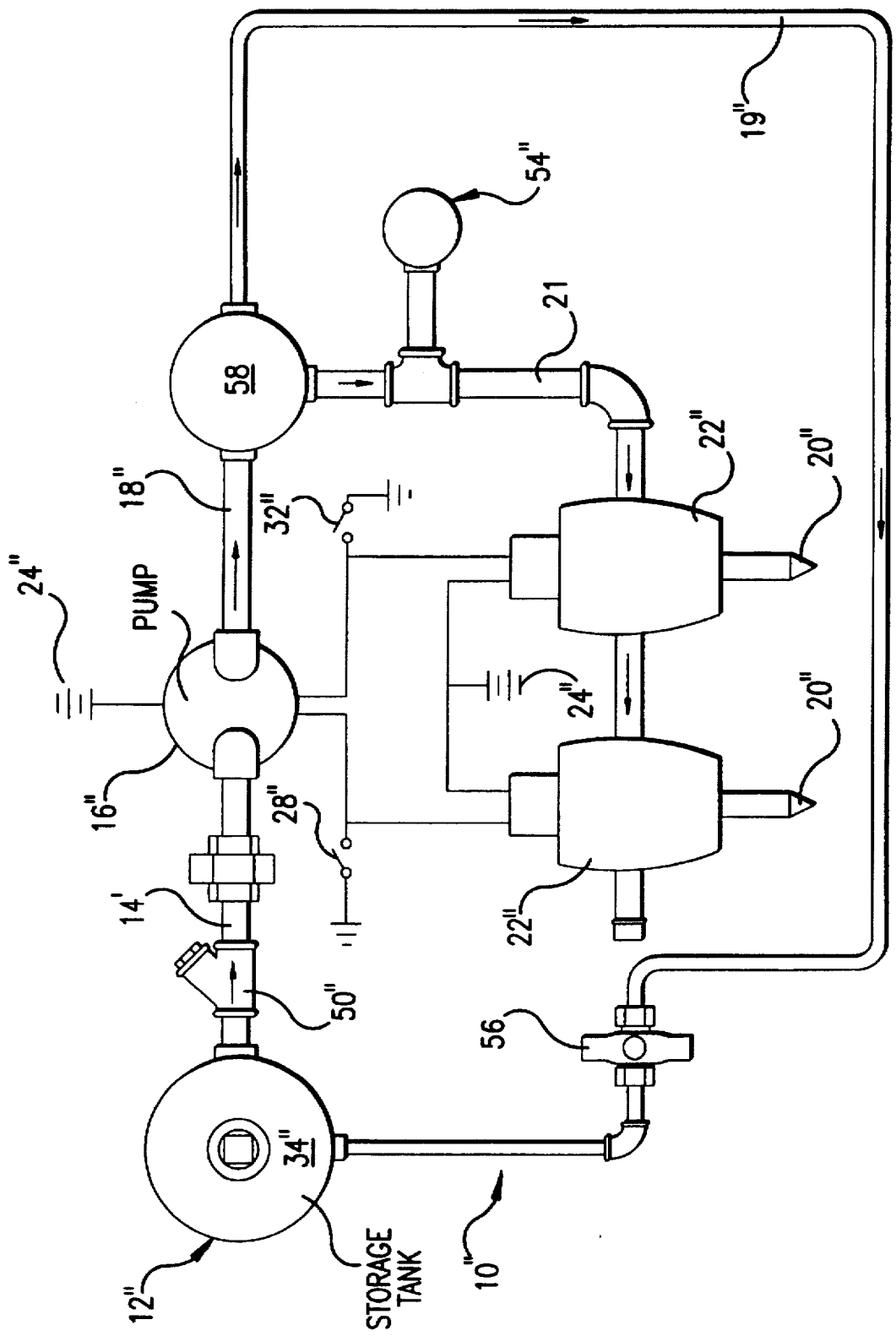
FIG. 3 is a schematic side view of a third security system in accordance with this invention.

Yet another embodiment of a security system according to this invention is illustrated in FIG. 3, security system 10". Security system 10" is the same as security system 10' except that security system 10" includes pressure tank 58 and fourth piping assembly 21. Accordingly, in FIG. 3, the elements of security system 10" which correspond to the elements of security system 10' are identified by the same number followed by a double prime, "''".

Security system 10" is designed for environments (1) in which it is desirable to have a pressure tank and (2) for which a pressure tank does not pose a safety problem.

In security system 10", the fluid is pumped by the pump of pump assembly 16" from storage tank 34" to pressure tank 58 through second piping assembly 18". The fluid then travels from pressure tank 58 to nozzle coupling assemblies 20" through fourth piping assembly 21 when security system 10" is activated. When security system 10" is deactivated, any unwanted pressure is relieved through pressure relief valve 56.

Figure 4:
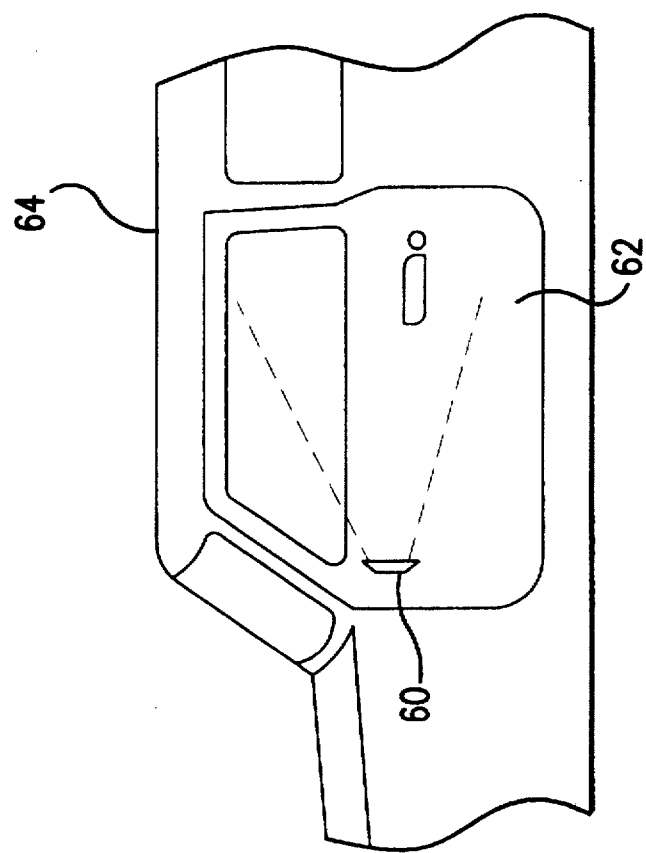
FIG. 4 is a side view of a vehicle having the security system of FIG. 1.

As stated, the security systems according to this invention can be employed in many environments. The systems can be permanently installed in motor vehicles, such as cars, with the spray nozzles 60 recessed within the doors 62 or other exterior elements of the vehicles 64 as shown in FIG. 4. Such systems can be manually operated by a pushbutton, toggle switch or other manual switch mechanism in the vicinity of the driver, or can be activated by automatic sensory devices such as photoelectric cells or heat sensors. Further, as stated, it is possible to have a system which is activated by both, having a pushbutton or other type of manual operation within the car and a sensory mechanism outside the vehicle. In such systems, the sensory mechanism on the exterior of the vehicle may be armed when the vehicle is unoccupied and disarmed when the vehicle is occupied.

Also, as stated, the security systems can be either portable or fixed systems. If portable, the systems can be removed from vehicles when desired. Also, the portable systems can be used in different environments.

In addition, other embodiments may be designed to hook onto an exterior of a vehicle, such as a bumper and to have the spray nozzle oscillate back and forth for specific purposes such as crowd control.

Figure 5:
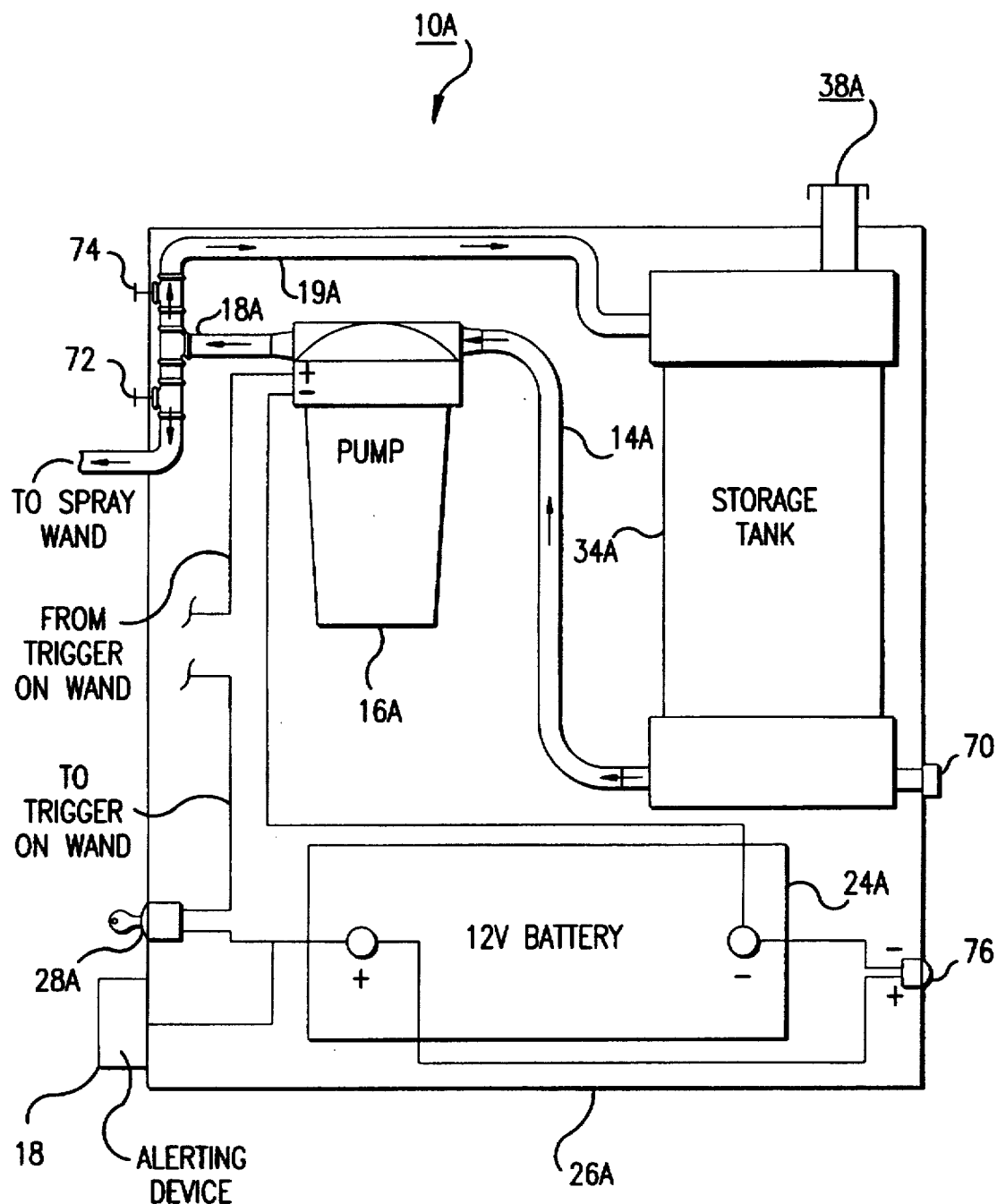
FIG. 5 is a schematic side view of a fourth security system in accordance with this invention.

Still yet another embodiment of a security system according to this invention is illustrated in FIG. 5, a self-mixing pepper spray security system 10A. Security system 10A is the same as security system 10 except that security system 10A includes a drain 70, a charging jack 76 for the power supply 24A, return shutoff valve 74 and a wand (nozzle) shutoff valve 72. Accordingly, in FIG. 5, the elements of the security system 10A which correspond to the elements of security system 10 are identified by the same number followed by a capital letter designation, "A".

Security system 10A is for environments in which it is desirable to have an effective mixing capability. Security system 10 includes a self-mixing function through the needle valve assembly 52. However, the self-mixing function is preferably encompassed in the valve assemblies 72 and 74 shown in the security system 10A. In security system 10A, the return shutoff valve 74 and the wand shutoff valve 72 replace the needle valve assembly 52 and the solenoid assembly 22 of the security system 10. In security system 10A, the fluid is pumped by the pump assembly 16A from the storage tank 34A to a first piping assembly 14A which can optionally include a check valve assembly (not shown) that connects to the pump assembly 16A. The fluid then travels from the pump assembly 16A through a second piping assembly 18A. The second piping assembly 18A terminates in the wand shutoff valve 72 and the return shutoff valve 74. When the wand shutoff valve 72 is open, the fluid will flow to the nozzle 60 (not shown) to be dispensed from the security system 10A. When the wand shutoff valve 72 is closed and the return shutoff valve 74 is open, the fluid travels from the return shutoff valve 74 through the third piping assembly 19A to the storage tank 34A.

In this embodiment, the fluid travels through the security system 10A when the security system 10A is activated. When the security system 10A is deactivated, any unwanted pressure can be relieved through a pressure relief valve (not shown).

The security system 10A is designed to dispense a deterrent fluid. A typical deterrent fluid is a mixture of water and oleoresin capsicum (OC), commonly called pepper spray. The OC particulate is mixed into the water and suspended in the water as a pepper spray mixture. Problems exist with conventional security systems, however, in that the OC is a solid material that settles out from a suspended state in the water. The security system 10A contains a self-mixing function via the third flow path from the return shutoff valve 74 to the storage tank 34A. Typically, the storage tank 34A will be a closed tank holding less than one gallon of deterrent fluid. Further, the security system 10A is a small unit preferably weighing under 35 pounds. Thus, security system 10A can be transported by a person in a backpack or other means, and system 10A can be used while in the backpack or other means.

In a mixing state the wand shutoff valve 72 is closed and the return shutoff valve 74 is open when the pump 16A is activated. As discussed above, in this state the fluid travels a closed path through the security system 10A so that the deterrent particulate OC becomes suspended in the fluid. Then, the pump assembly 16A is deactivated. Next, the wand shut off valve 72 is opened and the return shutoff valve 74 is closed. Beneficially, this automated or manually controlled mixing function ensures that the deterrent fluid ejected from the security system 10A through the nozzle 60 (not shown) always contains the correct amount of deterrent particulate in the deterrent fluid. This self-mixing function further eliminates the need for manual mixing by the user of potentially hazardous materials. In a preferred embodiment, the return shutoff valve 74 and the wand shutoff valve 72 are not closed at the same time when the pump assembly 16A is activated.

As stated, the security system 10A can be used in, for example, a backpack unit where a hand-held wand dispenses a directed stream for individual targets or a diffused spray for entire crowd control applications. In this situation, the self-mixing function allows the user to maintain the correct amount of suspended deterrent material easily and quickly while the unit is in use. In a second situation, the security system 10A can be used is as a stand-alone unit to protect an area of space. As discussed above, in the second situation, the security system 10A would be triggered by a photocell or other sensor. In addition, the security system 10A is easily reloaded. The security system 10A usually includes an alerting device 78, such as an audible alarm, a visual alarm or a connection to a monitoring system.

Further, as stated, the security systems could be installed in a fixed structure, for example, homes, retail establishments and other commercial establishments such as banks. The systems in these environments could be manually or automatically activated, or both.

Other improvements, embodiments and modifications to this invention will become apparent to those skilled in the art once given this disclosure. Such other embodiments, improvements and modifications are considered to be within the scope of the claims as set forth below.

What is claimed is:

1. A security system for protecting property or people, comprising:
   a storage tank containing a deterrent fluid, wherein the deterrent fluid includes a deterrent particulate;
   at least one spray nozzle coupling assembly;
   a pump for pumping said deterrent fluid from said storage tank to said spray nozzle coupling assembly;
   first flow means providing flow of said deterrent fluid from said storage tank to said pump;
   second flow means constituting a first flow path from said pump to said spray nozzle coupling assembly, said second flow means including means for activating said spray nozzle coupling assembly;
   third flow means constituting a second flow path directly from said second flow means back to said storage tank for mixing, said third flow means being connected to said first flow path between said pump and said activating means;
   first switch means for activating said pump to operate the security system; and
   second switch means for controlling said activating means to switch between a mixing state and an alarm state, wherein in the mixing state said activating means directs said fluid through said second flow path to storage tank to mix the deterrent particulate in the deterrent fluid, and wherein in the alarm state said activating means directs said fluid from said storage tank through said first and second flow paths to said spray nozzle coupling assembly.

2. The security system of claim 1, wherein said deterrent particulate is an oleoresin capsicum particulate.

3. The security system of claim 2, wherein the deterrent particulate requires agitation to remain suspended in said deterrent fluid, wherein an effectivity of said deterrent fluid is increased when the deterrent particulate is suspended, which occurs in the mixing state.

4. The security system according to claim 1 wherein said activating means includes a nozzle shutoff valve and a return shutoff valve, wherein one of the return shutoff valve and the nozzle valve are always open when the security system is activated.

5. The security system according to claim 1 wherein the first switch means includes an automated sensor.

6. The security system according to claim 5, further comprising an audible alarm, wherein the automated sensor activates the audible alarm and pump simultaneously.

7. The security system according to claim 6, further comprising a timer, wherein upon a detection by the automated sensor the first switch means activates the pump, sets the second switch means to the mixing state for a predetermined time monitored by the timer, and then sets the second switch means to the alarm state while concurrently activating the audible alarm.

8. The security system according to claim 1, wherein the storage tank contains less than a gallon of said deterrent fluid.

9. The security system according to claim 1, wherein said security system is a human-portable system.

10. A method of operating a pre-mixing pepper spray security system having a pump connected by a first piping assembly to a storage tank and connected to a nozzle by a second piping assembly, the security system contained in a human-portable backpack, comprising:

filling a storage tank with less than a gallon of fluid;

adding a deterrent particulate to the fluid in the storage tank;

opening a return path from the pump to the storage tank;

mixing the deterrent particulate and the fluid to form a deterrent fluid by activating the pump to transport the fluid through a closed path including the tank, the first piping assembly, the pump and the return path within the security system;

deactivating the pump;

triggering a sensor alarm on the security system;

opening the second piping assembly;

dispensing the deterrent fluid from the security system by activating the pump to transport the fluid through an open path including the tank, the first piping assembly, the pump, the second piping assembly and the nozzle, in response to the sensor alarm.

11. The method of claim 10, wherein the alarm is at least one of a sensor alarm on the security system and a manual control for a user.

12. The method of claim 10, further comprising refilling the security system by performing the filling, adding, opening and mixing steps.

13. A pre-mixing pepper spray security system having a pump connected by a first piping assembly to a storage tank and connected to a nozzle by a second piping assembly, the security system contained in a human-portable backpack, comprising:

means for filling a storage tank with less than a gallon of fluid;

means for adding a deterrent particulate to the fluid in the storage tank;

means for opening a return path from the pump to the storage tank;

means for mixing the deterrent particulate and the fluid by activating the pump to transport the fluid through a closed path including the tank, the first piping assembly, the pump and the return path within the security system to form a deterrent fluid;

means for deactivating the pump;

means for triggering a sensor alarm on the security system;

means for opening the second piping assembly;

means for dispensing the deterrent fluid from the security system by activating the pump to transport the fluid through an open path including the tank, the first piping assembly, the pump, the second piping assembly and the nozzle, in response to the sensor alarm.

\* \* \* \* \*